(12) United States Patent
Becher et al.

(10) Patent No.: US 11,190,336 B2
(45) Date of Patent: Nov. 30, 2021

(54) PRIVACY-PRESERVING BENCHMARKING WITH INTERVAL STATISTICS REDUCING LEAKAGE

(71) Applicant: SAP SE, Walldorf (DE)

(72) Inventors: Kilian Becher, Dresden (DE); Axel Schroepfer, Borthen (DE)

(73) Assignee: SAP SE, Walldorf (DE)

( * ) Notice: Subject to any disclaimer, the term of this patent is extended or adjusted under 35 U.S.C. 154(b) by 136 days.

(21) Appl. No.: 16/409,538

(22) Filed: May 10, 2019

(65) Prior Publication Data
US 2020/0358594 A1 Nov. 12, 2020

(51) Int. Cl.
*H04L 9/00* (2006.01)
*G09C 1/00* (2006.01)
*H04L 9/32* (2006.01)

(52) U.S. Cl.
CPC .............. *H04L 9/008* (2013.01); *G09C 1/00* (2013.01); *H04L 9/3242* (2013.01); *H04L 2209/46* (2013.01)

(58) Field of Classification Search
CPC ... H04L 9/008; H04L 9/3242; H04L 2209/46; H04L 2209/42; H04L 9/0643; G09C 1/00
See application file for complete search history.

(56) References Cited

U.S. PATENT DOCUMENTS

| | | | |
|---|---|---|---|
| 8,626,749 B1* | 1/2014 | Trepetin | H04L 9/0894 707/722 |
| 9,413,526 B1* | 8/2016 | Kothari | H04L 63/0435 |
| 9,641,332 B1* | 5/2017 | Yung | H04L 9/30 |
| 10,360,392 B2* | 7/2019 | Smith | H04L 9/0819 |

(Continued)

FOREIGN PATENT DOCUMENTS

WO WO-2017171726 A1 10/2017

OTHER PUBLICATIONS

Extended European Search Report, dated Apr. 17, 2020, for European Patent Appl. No. 19204789.2, 8 pages.
(Continued)

*Primary Examiner* — Aravind K Moorthy
(74) *Attorney, Agent, or Firm* — Sterne, Kessler, Goldstein & Fox P.L.L.C.

(57) ABSTRACT

Disclosed herein are computer-implemented method, system, and computer-program product (computer-readable storage medium) embodiments for benchmarking with statistics in a way that reduces leakage, preserving privacy of participants and secrecy of participant data. An embodiment includes receiving a plurality of encrypted values and computing a composite statistic corresponding to at least a subset of the plurality of encrypted values. An embodiment may further include outputting the at least one composite statistic. The composite statistic may be calculated to be distinct from any encrypted value of the plurality of encrypted values, thereby preserving privacy. Further embodiments may also include generating a comparison between the composite statistic and a given encrypted value of the plurality of encrypted values, as well as outputting a result of the comparison. In some embodiments, encrypted values may be encrypted using at least one encryption key, for example, according to a homomorphic or semi-homomorphic encryption scheme.

20 Claims, 9 Drawing Sheets

100

(56) References Cited

U.S. PATENT DOCUMENTS

| | | | |
|---|---|---|---|
| 10,936,744 B1* | 3/2021 | Trepetin | H04L 9/008 |
| 2002/0067832 A1* | 6/2002 | Jablon | H04L 9/085 |
| | | | 380/277 |
| 2004/0030932 A1* | 2/2004 | Juels | H04W 12/126 |
| | | | 713/151 |
| 2004/0172550 A1* | 9/2004 | Sai | H04L 63/04 |
| | | | 713/193 |
| 2010/0014657 A1* | 1/2010 | Kerschbaum | G06Q 20/384 |
| | | | 380/28 |
| 2010/0091984 A1* | 4/2010 | Kerschbaum | G06F 21/72 |
| | | | 380/30 |
| 2011/0194691 A1* | 8/2011 | Rane | H04L 9/008 |
| | | | 380/255 |
| 2012/0131355 A1* | 5/2012 | Nishimura | H04L 9/0861 |
| | | | 713/189 |
| 2012/0131581 A1* | 5/2012 | Zielinski | G06Q 10/10 |
| | | | 718/100 |
| 2013/0254494 A1* | 9/2013 | Oxford | G06F 12/0837 |
| | | | 711/145 |
| 2013/0275743 A1* | 10/2013 | Jawurek | H04L 9/008 |
| | | | 713/150 |
| 2014/0137262 A1* | 5/2014 | Stofberg | G06F 11/1453 |
| | | | 726/26 |
| 2014/0188498 A1* | 7/2014 | Petrimoulx | G06Q 30/0607 |
| | | | 705/2 |
| 2015/0170197 A1* | 6/2015 | Smith | H04L 9/008 |
| | | | 705/14.41 |
| 2015/0372808 A1* | 12/2015 | Bilogrevic | H04L 9/085 |
| | | | 380/279 |
| 2015/0381362 A1* | 12/2015 | Thota | G06F 21/6236 |
| | | | 713/189 |
| 2016/0342812 A1* | 11/2016 | Lynch | G16H 10/60 |
| 2017/0063524 A1* | 3/2017 | Bruneau | H04L 9/005 |
| 2017/0091475 A1* | 3/2017 | Fan | G06F 21/6218 |
| 2017/0132420 A1* | 5/2017 | Shetty | G09C 1/04 |
| 2017/0132431 A1* | 5/2017 | Blanco | G06F 21/6254 |
| 2017/0359321 A1* | 12/2017 | Rindal | G06Q 30/08 |
| 2018/0139038 A1* | 5/2018 | Schepers | H04L 9/002 |
| 2018/0145825 A1* | 5/2018 | Isshiki | H04L 9/0869 |
| 2018/0262327 A1* | 9/2018 | Jain | G06N 20/20 |
| 2018/0278586 A1* | 9/2018 | Driscoll | H04L 9/0662 |
| 2018/0294965 A1* | 10/2018 | Yan | H04L 9/321 |
| 2018/0365290 A1* | 12/2018 | Kaushik | G06F 16/24542 |
| 2018/0366227 A1* | 12/2018 | Kawamoto | G06F 7/5443 |
| 2019/0050599 A1* | 2/2019 | Canard | G06F 16/24554 |
| 2019/0058991 A1* | 2/2019 | Al-Kabra | H04L 63/0421 |
| 2019/0074962 A1* | 3/2019 | Ateniese | H04L 63/061 |
| 2019/0080116 A1* | 3/2019 | Kenthapadi | H04L 9/0643 |
| 2019/0097985 A1* | 3/2019 | Torres | H04L 63/061 |
| 2019/0109701 A1* | 4/2019 | Paz de Araujo | H04L 63/0435 |
| 2019/0114438 A1* | 4/2019 | Hersans | H04L 9/0891 |
| 2019/0130129 A1* | 5/2019 | Huang | G06F 16/285 |
| 2019/0130130 A1* | 5/2019 | Huang | G06K 9/6218 |
| 2019/0130131 A1* | 5/2019 | Huang | G16Z 99/00 |
| 2019/0147770 A1* | 5/2019 | Yoshino | G06F 21/6254 |
| | | | 713/193 |
| 2019/0180276 A1* | 6/2019 | Lee | H04L 63/10 |
| 2019/0182035 A1* | 6/2019 | Chari | H04L 9/083 |
| 2019/0294819 A1* | 9/2019 | Roake | G06F 21/6254 |
| 2019/0342088 A1* | 11/2019 | Eidson | H04L 9/14 |
| 2020/0007344 A1* | 1/2020 | Chepak, Jr. | H04L 9/0643 |
| 2020/0082112 A1* | 3/2020 | Altshuler | G06F 21/6227 |
| 2020/0117831 A1* | 4/2020 | Eckhard | H04L 9/0643 |
| 2020/0173876 A1* | 6/2020 | Jackson | G01L 5/167 |
| 2020/0235908 A1* | 7/2020 | Hiromasa | G06F 21/71 |
| 2020/0272760 A1* | 8/2020 | Kurian | G06F 21/31 |
| 2020/0327250 A1* | 10/2020 | Wang | G16B 50/40 |
| 2020/0358599 A1* | 11/2020 | Angel | G06F 16/2471 |
| 2020/0387616 A1* | 12/2020 | Tanaka | H04L 9/0894 |

OTHER PUBLICATIONS

Becher, K., "Privacy-preserving key figure comparison using Secure Multi-Party Computation," Technische Universitat Dresden Master's Thesis, Nov. 9, 2017, pp. I-XVI and 1-120.

Becher, K. et al., U.S. Appl. No. 16/036,288, entitled "Private Benchmarking Cloud Service with Enhanced Statistics," filed Jul. 16, 2018.

Brakerski, Z. et al., "Fully Homomorphic Encryption without Bootstrapping," Electronic Colloquium on Computational Complexity, Report No. 111, 2011, pp. 1-26.

Cloud Foundry—Open Source Cloud Application Platform [online]. 2019 [retrieved on May 3, 2019], retrieved from the Internet:<https://www.cloudfoundry.org>, 10 pages.

Cramer, R. et al., Secure Multiparty Computation and Secret Sharing, Cambridge University Press, ISBN 978-1-107-04305-3, Copyright 2015, pp. 3-13.

Fan, J. et al., "Somewhat Practical Fully Homomorphic Encryption," IACR Cryptology ePrint Archive, 2012, 19 pages.

Gentry, C., "Fully Homomorphic Encryption Using Ideal Lattices," STOC 2009, pp. 169-178.

Gentry, C. et al., "Homomorphic Encryption from Learning with Errors: Conceptually-Simpler, Asymptotically-Faster, Attribute-Based," CRYPTO(1), Jun. 8, 2013, 25 pages.

Goldreich, O. et al., "How to Play Any Mental Game or a Completeness Theorem for Protocols with Honest Majority," Proc. of the 19th Annual ACM Symp. on Theory of Computing, 1987, pp. 218-229.

Hirt, M., "Multi-Party Computation: Efficient Protocols, General Adversaries, and Voting," ETH Zurich Dissertation, 2001, 174 pages.

Katz, J. et al., Introduction to Modern Cryptography, Chapman & Hall/CRC, ISBN 978-1-58488-551-1, 2008, pp. 333-346 and 408-417.

Kerschbaum, F., "Practical Privacy-Preserving Benchmarking," Proc. of the IFIP TC 11 23rd Int'l Information Security Conference, 2008, pp. 17-31.

Kerschbaum, F., "A Privacy-Preserving Benchmarking Platform," Karlsruhe Institute of Technology Dissertation, Jun. 16, 2010, pp. i-xii and 1-145.

Mukherjee, P. et al., "Two Round Multiparty Computation via Multi-Key FHE," EUROCRYPT Feb. 27, 2016, pp. 1-32.

Schroepfer, A. et al., U.S. Patent Appl. No. to be assigned, entitled "Pooling Requirements While Preserving Privacy," filed concurrently herewith.

* cited by examiner

PRIVACY-PRESERVING BENCHMARKING WITH INTERVAL STATISTICS REDUCING LEAKAGE

BACKGROUND

Benchmarking may be used herein to refer to comparison of key performance indicators (KPI) among a peer group. KPIs may be statistical quantities that may be used for evaluating the performance of an enterprise, for example. A peer group thus may be a set of similar enterprises that compare KPIs. Members of a peer group may compete with each other in a given industry, implying a demand for keeping the KPIs secret and ensuring privacy of corresponding members of the peer group, such that an association between a peer group member and a corresponding KPI is not revealed to a third party.

One possible approach to privacy-preserving benchmarking is using a trusted third party (TTP) that conducts the corresponding calculation of some function f(x) without revealing any private data. However, with mutually distrusting companies, finding such a TTP may prove difficult. An approach that does not require trust may be found in the field of secure multi-party computation (MPC). The participants providing an input $x_i$ are referred to as "players" while those who compute f(x) are called "processors." A participant may be both player and processor at the same time. MPC may be secure in the sense that any given participant may only learn the outputs and what may be inferred from the outputs with respect to the participant's known inputs.

For example, an enterprise in a manufacturing industry with at least several peer enterprises, may seek to reduce production costs. To make well-informed decisions for efficiency, e.g., not to waste effort on improvements that do not yield benefits outweighing costs of the improvements themselves, members of a peer group may compare their own production KPIs, e.g., the time required for assembly of components or finished products, to those of other peers in the same industry, via benchmarking analyses. Thus, in one example, according to results of benchmarking, a given enterprise may find itself among the best performing in its group for a given KPI. In that case, further efforts to improve that KPI may not yield sufficient marginal benefit to justify the efforts to improve. On the other hand, below-average performance for a given KPI may imply higher potential for improvement of an enterprise with respect to its peers in the same industry.

As enterprises may be reluctant to divulge their confidential production KPIs, which may be private and sensitive for a variety of reasons, benchmarking analyses therefore must be conducted in a manner that ensures privacy of the companies' KPIs and still provides desired statistical measures at a level of accuracy sufficient to be informative. Existing benchmarking systems may provide as outputs a variety of statistical measures such as a mean, variance, median, minimum, maximum, and quartiles of the companies' confidential KPIs. However, rank-based statistical measures like the median, maximum, and quartiles are by definition particular values of the input set of confidential KPIs. Therefore, even though such statistical measures are important for peers that seek to evaluate their performance among their peer group, these statistical measures may leak at least some information on the confidential KPIs of the peer group members involved in the benchmarking analysis. Hence, enterprises may be reluctant to participate in such benchmarking analysis.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for benchmarking with statistics in a way that reduces leakage, preserving privacy of participants and secrecy of participant data.

Privacy-preserving benchmarking analysis may be described as a process of comparing KPIs, where the KPIs are treated as secure inputs across different companies. Every member of a peer group may learn how it performs with respect to the other members involved collectively, but no member need divulge its identity, private KPIs, or other confidential information to a third party, trusted or otherwise. Such privacy-preserving benchmarking analyses may be repeated on a regular basis, e.g., annually, quarterly, monthly, etc., to investigate performance development over time relative to a given industry.

In an example of an oblivious transfer (OT) protocol, a first player $P_1$ has l secret messages $m_1, \ldots, m_l$ with $l \geq 2$. Additionally, a second player $P_2$ wants to select and receive message $m_i$ without $P_1$ learning the value i. Furthermore, $P_1$ does not want $P_2$ to learn anything apart from $m_i$. Such an OT protocol may be denoted by $$P_1 \xrightarrow{OT} P_2,$$

according to this example. For further description of existing OT techniques, refer to Florian Kerschbaum's 2010 doctoral thesis, "A Privacy-Preserving Benchmarking Platform," incorporated by reference herein.

Assuming an asymmetric cryptosystem with a (randomized) encryption function E(•) and a decryption function D(•), homomorphic cryptosystems enable computations for plaintext secret values $x_i, \ldots, x_n$ given only their ciphertexts, $E(x_i) \ldots, E(x_n)$. Applying an operation to such ciphertexts may yield the ciphertext of the result of a corresponding homomorphic operation as if it were applied to the plaintexts and encrypted. Such cryptosystems may provide homomorphic operations for one or more arithmetic operations. Semi-homomorphic encryption (SHE) schemes provide one such homomorphism, e.g., addition or multiplication. By contrast, fully homomorphic encryption (FHE) schemes may enable at least two arithmetic operations, e.g., addition and multiplication, such that the combination of these two operations may allow for computation of arbitrary arithmetic functions. For example, Paillier's additively (semi-)homomorphic cryptosystem may have the properties shown in Equations (1) and (2):

$$D(E(x_1) \cdot E(x_2)) = x_1 + x_2 \qquad (1)$$

$$D(E(x_1)^{x_2}) = x_1 \cdot x_2 \qquad (2)$$

Rivest-Shamir-Adleman (RSA)'s multiplicatively (semi-) homomorphic cryptosystem may provide the following:

$$E(x_1) \cdot E(x_2) = x_1 \cdot x_2 \qquad (3)$$

Homomorphic semantically secure cryptosystems may allow re-randomization of ciphertexts as follows:

$$E(x_i + 0) = E(x_i) \cdot E(0) = E'(x_i) \qquad (4)$$

With a relatively high probability, $E(x_i) \neq E'(x_i)$ may be provided such that $E(x_i)$ and $E'(x_i)$ may be computationally indistinguishable.

While examples considered herein may focus more on Paillier's encryption schemes, other additively homomorphic encryption schemes and equivalents may be used here instead, within the spirit and scope of this disclosure.

Statistical measures mean, variance, median, minimum, maximum, bottom quartile, and top quartile for a list of n values $x_1, \ldots, x_n$ may be defined as follows:

1. Mean: the arithmetic average $$\mu = \frac{1}{n} \cdot \sum_{i=1}^{n} x_i \qquad (5)$$

2. Variance: the squared standard deviation $$\sigma^2 = \frac{1}{n} \cdot \sum_{i=1}^{n} (x_i - \mu)^2 \qquad (6)$$

3. Median: the middle value of the sorted list where $\tilde{x}_i$ denotes the i-th element of the sorted list of the values $x_i$— a. If n is odd:

$$\tilde{x}_{med} = \tilde{x}_{\frac{n+1}{2}} \qquad (7)$$

b. If n is even:

$$\tilde{x}_{med} = \frac{1}{2} \cdot \left( \tilde{x}_{\frac{n}{2}} + \tilde{x}_{\frac{n}{2}+1} \right) \qquad (8)$$

c. Alternate definition (for any natural number n):

$$\tilde{x}_{med} = \tilde{x}_{\lceil \frac{n}{2} \rceil} \qquad (9)$$

4. Minimum—the smallest, i.e., first, value of a sorted list in ascending order:

$$\tilde{x}_{min} = \tilde{x}_1 \qquad (10)$$

5. Maximum—the largest, i.e., last, value of a sorted list in ascending order:

$$\tilde{x}_{max} = \tilde{x}_n \qquad (11)$$

6. Bottom quartile—the largest, i.e., last, value of the lowest quarter of a sorted list:

$$Q_B = \tilde{x}_{\lceil \frac{n}{4} \rceil} \qquad (12)$$

7. Top quartile—the smallest, i.e., first, value of the highest quarter of a sorted list:

$$Q_T = \tilde{x}_{\lfloor \frac{3 \cdot n}{4} + 1 \rfloor} \qquad (13)$$

In the considerations that follow, calculations of median values may use the alternate definition given in statistical measure 3.c. above, but other definitions may be used without departing from the spirit or scope of this disclosure.

Figure 1:
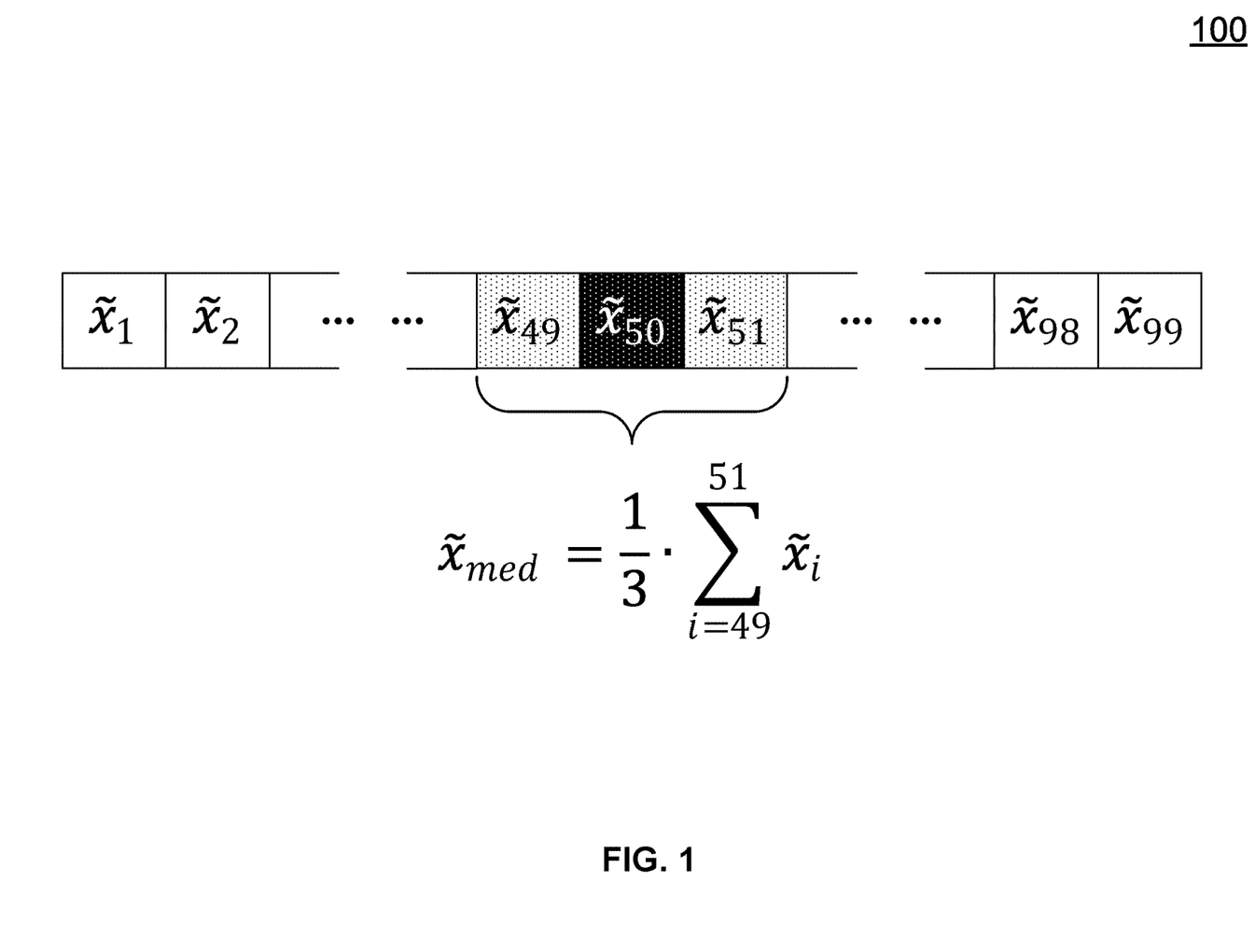
FIG. 1 depicts an interval for the median of a list, according to some embodiments.

In some embodiments of secure benchmarking protocols presented herein, improvements may be realized over previous benchmarking systems, such as in terms of more complex computations of rank-based statistical measures, such as median, minimum, maximum, bottom quartile, and top quartile, for example. Instead of providing a precise element representing a particular statistical measure, an interval surrounding the respective element may be used as a basis for a composite statistic, e.g., mean, of the interval, providing one layer of anonymization for individual input values within the interval, for example. A size k of this interval may be chosen dynamically and may be known to every participant. FIG. 1 depicts such an interval for the median element of a sorted list of inputs $\tilde{x}_1, \ldots, \tilde{x}_{99}$. In this case, the protocol may output a mean value $\mu$ of the k=3 elements (highlighted by shading) centered around and including the median of the list ($\tilde{x}_{49}, \tilde{x}_{50}, \tilde{x}_{51}$), instead of the exact median element ($\tilde{x}_{50}$) (highlighted by darker shading).

Before protocol execution, each player $P_i$ may learn the following two keys, e.g., via a certificate authority (CA) and/or public key infrastructure (PKI) as described in the 2010 Kerschbaum thesis cited above and incorporated herein:

$K_{DEC}$: Secret decryption key of the SHE scheme.
$K_{MAC}$: Symmetric key of a message authentication code (MAC).

Every participant, including the service provider $P_S$, may also learn a public encryption key $K_{ENC}$ corresponding to $K_{DEC}$. The players may use the same secret key for decryption. The players thus may directly communicate with the service provider only, such as via pairwise channels that are secured using standard methods for protecting transmission over insecure networks.

In some embodiments, HE or SHE may be implemented using symmetric-key cryptosystems, in which the same secret key is used for both encryption and decryption, but without the service provider knowing the secret key. In scenarios where the service provider needs to encrypt data as part of the computation, asymmetric-key cryptosystems using separate keys for encryption and decryption may be used instead of symmetric-key cryptosystems, to avoid allowing service providers direct access to sensitive data—the cleartext may thus be inaccessible to $P_S$.

The protocol used here may include a combination of techniques such as summation, rank computation, selection, and decryption. Summation of encrypted values may be conducted by multiplying the ciphertexts (see Equation (1)). For n values $x_i$, the encrypted sum may be represented by $$E(\text{sum}) = E\left(\sum_{i=1}^{n} x_i\right) = \prod_{i=1}^{n} E(x_i). \qquad (14)$$

Summation may be used for calculation of the mean mean (steps 1 and 2) and of the variance var (steps 17 and 18), for example. The sum may be cryptographically blinded by adding a random value. Because players may know the size n of the peer group, then given the sum, each player may in turn be able to compute the mean by dividing the sum by n.

Rank computation may yield a rank of a value $x_i$ in a list that is sorted in ascending order. To this end, the value $x_i$ may be compared to each value $x_j$. For that comparison, the indices of the secret values may be permuted by permutations $\phi$ and $\phi'$. The assigned element of i may be denoted by $\phi(i)$ while the corresponding assigned element of j may then have index $\phi'(j)$. The difference between $x_{\phi(i)}$ and $x_{\phi'(j)}$ may be cryptographically blinded by two random values $1 \leq r_2$ and $0 \approx r_3 \ll r_{2j}$. These random values may be chosen individually from the set of natural numbers or from the plaintext space of the cryptosystem being used, for each j. The blinded difference $$c_{\phi(i)\phi'(j)} = r_{2j} \cdot (x_{\phi(i)} - x_{\phi'(j)}) + r_{ej} \qquad (15)$$

may then be stored in a vector $\vec{c}_{\phi(i)}$. Counting the non-negative elements $\text{pos}(\vec{c}_{\phi(i)})$ of that vector may yield a number of input values smaller than $x_{\phi(i)}$. Given that list, a given vector's rank may be found by the following:

$$\text{rank}_{\phi(i)} = \text{pos}(c_{\phi(i)}) + 1. \qquad (16)$$

Now, due to the permutations (e.g., $\phi$ and $\phi'$), a given player (e.g., $P_i$, for any unique value i denoting a specific member of a peer group, and which may be iterated over any or all members of a peer group) may hold a rank of a value $x_{\phi(i)}$ corresponding to player $P_{\phi(i)}$. Rank computation may be performed in the protocol (e.g., protocol step 3 of the 48 example protocol steps listed below). Rank computation may be used for calculation of the median med, minimum min, the maximum max, the bottom quartile bquart, and the top quartile tquart, for example.

Selection may refer to an action of computing the ciphertext of a secret value with specific (selected) rank. $P_S$ may choose a random value $r_i$ individually for each player $P_i$ and may compute ciphertext $E(x_{\phi(i)} + r_i)$ and $E(r_i)$. This computation may be regarded in cryptographic terms as the value of $P_i$'s assigned rank blinded by $r_i$ and a 0 blinded by $r_i$. By using a 1-out-of-2 OT protocol (a type of oblivious transfer), a player $P_i$ may receive $E(x_{\phi(i)} + r_i)$ (cryptographically blinded secret value), if the player's assigned rank is in the interval of k selected ranks. Other players may receive the blinded 0. For statistical measures, e.g., median, minimum, maximum, bottom quartile, and top quartile, intervals of size k may be determined as follows:

$$I_{med} = \left[\left\lceil \frac{n-(k-1)}{2} \right\rceil, \left\lceil \frac{n+(k-1)}{2} \right\rceil\right] \qquad (17)$$

$$I_{min} = [1, k] \qquad (18)$$

$$I_{max} = [n-(k-1), n] \qquad (19)$$

$$I_{bquart} = \left[\left\lceil \frac{n-2 \cdot (k-1)}{4} \right\rceil, \left\lceil \frac{n+2 \cdot (k-1)}{4} \right\rceil\right] \qquad (20)$$

$$I_{tquart} = \left[\left\lceil \frac{3 \cdot n - 2 \cdot (k-1)}{4} \right\rceil + 1, \left\lceil \frac{3 \cdot n + 2 \cdot (k-1)}{4} \right\rceil + 1\right] \qquad (21)$$

After the OT step, players may re-randomize the value received by multiplying the value received by an encrypted 0 (see Equation (4) above), sending the product to the service provider. The service provider may multiply the encrypted values he received, remove random values $r_i$, and obtain an encrypted sum $\text{sum}_k$ of the k inputs $X_{\phi(i)}$ in the respective interval. Since the players may know the size k of the interval, the players may compute the respective statistical measure by dividing $\text{sum}_k$ obtained from $P_S$ by the interval size k. Selection may be used for computing, e.g., the median, minimum, maximum, bottom quartile, and the top quartile. Selection examples may be seen in steps 4 to 8 (OT), steps 12 to 16 (returning the selected values), and steps 19 to 23 (computing the results).

Decryption of ciphertext results may be allowed for the service provider to learn the results, e.g., for purposes of other calculations. In this way, for example, the service provider may round the results before sending them to the players. Other examples are possible within the spirit and scope of this disclosure.

To decrypt the result v given the ciphertext E (v), $P_S$ may cryptographically blind a given result with a given random value r and send the blinded ciphertext $E(v+r)$ to the players. Each player $P_i$ may decrypt the blinded result and sends the plaintext v+r together with the corresponding MAC tag $$\theta_i = \text{MAC}(v+r\|i, K_{MAC}) \qquad (22)$$

back to $P_S$. The service provider may obtain v by subtracting the random value r, for example. To prove that the same encrypted, blinded result was sent to the players, $P_S$ may compute the hash $$h(\theta_1 = \text{MAC}(v+r\|1, K_{MAC}), \ldots,$$

$$\theta_n = \text{MAC}(v+r\|n, K_{MAC})) \qquad (23)$$

of the MAC tags $\theta_i$ received, using a cryptographic hash function. Together with the result v, $P_S$ may send this hash to the players. Each $P_i$ may then compute the MAC tags and the hash, and may compare the hash to the one received from the service provider and may obtain a validation bit $v_{s_i}$. This bit, where s indicates the protocol step, may be set to 1 in case of successful hash validation, and may be set to 0 otherwise. The validation bit may indicate whether the service provider has sent the same statistical measure to each P.

Decryption may be used for any of the statistical measures of mean, variance, median, minimum, maximum, bottom quartile, and top quartile, for example. Decryption may occur as shown in any of steps 2 and 18 through 23 (sending encrypted results), steps 9, 10, and 25 through 36 (returning decrypted, blinded results), steps 11 and 37 through 42 (sending decrypted results), and steps 24 and 43 through 48 (sending the hashed MAC tags).

With reference to the above disclosure as a preliminary foundation, a protocol for privacy-preserving benchmarking with interval statistics based on homomorphic encryption may include at least the following steps, with further description of the protocol steps below.

Step 1. $P_i \to P_S$: $E(x_i)$
Step 2. $P_S \to P_i$: $E(sum + r_1) = E(\Sigma_{i=1}^n x_i) \cdot E(r_1)$ Step 3.
$$E(\vec{c}_{\phi(i)}) = (\ldots, E(c_{\phi(i)_{\phi'(j)}}) = E(r_{2_j} \cdot (x_{\phi(i)} - x_{\phi'(j)}) + r_{3_j}), \ldots)$$

Step 4.
$$P_S \xrightarrow{OT} P_i: E_i^{med} = \begin{cases} E(x_{\phi(i)} + r_{4_i}) & \text{if } pos(\vec{c}_{\phi(i)}) \in I_{med} \\ E(r_{4_i}) & \text{otherwise} \end{cases}$$

Step 5.
$$E_i^{min} = \begin{cases} E(x_{\phi(i)} + r_{5_i}) & \text{if } pos(\vec{c}_{\phi(i)}) \in I_{min} \\ E(r_{5_i}) & \text{otherwise} \end{cases}$$

Step 6.
$$E_i^{max} = \begin{cases} E(x_{\phi(i)} + r_{6_i}) & \text{if } pos(\vec{c}_{\phi(i)}) \in I_{max} \\ E(r_{6_i}) & \text{otherwise} \end{cases}$$

Step 7.
$$E_i^{bquart} = \begin{cases} E(x_{\phi(i)} + r_{7_i}) & \text{if } pos(\vec{c}_{\phi(i)}) \in I_{bquart} \\ E(r_{7_i}) & \text{otherwise} \end{cases}$$

Step 8.
$$E_i^{tquart} = \begin{cases} E(x_{\phi(i)} + r_{8_i}) & \text{if } pos(\vec{c}_{\phi(i)}) \in I_{tquart} \\ E(r_{8_i}) & \text{otherwise} \end{cases}$$

Step 9. $P_i \to P_S$: $sum + r_1 = D(E(sum + r_1))$
Step 10. $MAC(sum + r_1 \| i, K_{MAC})$
Step 11. $P_S \to P_i$: $sum = sum + r_1 - r_1$
Step 12. $P_i \to P_S$: $E_i^{med'} = E_i^{med} \cdot E(0)$
Step 13. $E_i^{min'} = E_i^{min} \cdot E(0)$
Step 14. $E_i^{max'} = E_i^{max} \cdot E(0)$
Step 15. $E_i^{bquart'} = E_i^{bquart} \cdot E(0)$
Step 16. $E_i^{tquart'} = E_i^{tquart} \cdot E(0)$ Step 17.
$$E((x_i - \text{mean})^2) = E\left(\left(x_i - \frac{\text{sum}}{n}\right)^2\right)$$

Step 18. $P_S \to P_i$: $E(var + r_9) = E(\Sigma_{i=1}^n (x_i - \text{mean})^2) \cdot E(r_9)$
$= (\Pi_{i=1}^n E((x_i - \text{mean})^2)) \cdot E(r_9)$
Step 19. $E(med + r_{10}) = E(\Pi_{i=1}^n E_i^{med'} \cdot E(-r_{4_i})) \cdot E(r_{10})$
Step 20. $E(min + r_{11}) = E(\Pi_{i=1}^n E_i^{min'} \cdot E(-r_{5_i})) \cdot E(r_{11})$
Step 21. $E(max + r_{12}) = E(\Pi_{i=1}^n E_i^{max'} \cdot E(-r_{6_i})) \cdot E(r_{12})$
Step 22. $E(bquart + r_{13}) = E(\Pi_{i=1}^n E_i^{bquart'} \cdot E(-r_{7_i})) \cdot E(r_{13})$
Step 23. $E(tquart + r_{14}) = E(\Pi_{i=1}^n E_i^{tquart'} \cdot E(-r_{8_i})) \cdot E(r_{14})$
Step 24. $h(MAC(sum + r_1 \| 1, K_{MAC}), \ldots, MAC(sum + r_1 \| n, K_{MAC}))$
Step 25. $P_i \to P_S$: $var + r_9 = D(E(var + r_9))$
Step 26. $MAC(var + r_9 \| i, K_{MAC})$
Step 27. $med + r_{10} = D(E(med + r_{10}))$
Step 28. $MAC(med + r_{10} \| i, K_{MAC})$
Step 29. $min + r_{11} = D(E(min + r_{11}))$
Step 30. $MAC(min + r_{11} \| i, K_{MAC})$
Step 31. $max + r_{12} = D(E(max + r_{12}))$
Step 32. $MAC(max + r_{12} \| i, K_{MAC})$
Step 33. $bquart + r_{13} = D(E(bquart + r_{13}))$
Step 34. $MAC(bquart + r_{13} \| i, K_{MAC})$
Step 35. $tquart + r_{14} = D(E(tquart + r_{14}))$
Step 36. $MAC(tquart + r_{14} \| i, K_{MAC})$
Step 37. $P_S \to P_i$: $var = var + r_9 - r_9$
Step 38. $med = med + r_{10} - r_{10}$
Step 39. $min = min + r_{11} - r_{11}$
Step 40. $max = med + r_{12} - r_{12}$
Step 41. $bquart = bquart + r_{13} - r_{13}$
Step 42. $tquart = tquart + r_{14} - r_{14}$
Step 43. $P_S \to P_i$: $h(MAC(var + r_9 \| 1, K_{MAC}), \ldots, MAC(var + r_9 \| n, K_{MAC}))$
Step 44. $h(MAC(med + r_{10} \| 1, K_{MAC}), \ldots, MAC(med + r_{10} \| n, K_{MAC}))$
Step 45. $h(MAC(min + r_{11} \| 1, K_{MAC}), \ldots, MAC(min + r_{11} \| n, K_{MAC}))$
Step 46. $h(MAC(max + r_{12} \| 1, K_{MAC}), \ldots, MAC(max + r_{12} \| n, K_{MAC}))$
Step 47. $h(MAC(bquart + r_{13} \| 1, K_{MAC}), \ldots, MAC(bquart + r_{13} \| n, K_{MAC}))$
Step 48. $h(MAC(tquart + r_{14} \| 1, K_{MAC}), \ldots, MAC(tquart + r_{14} \| n, K_{MAC}))$ Round 1 (step 1): Each player $P_i$ may send encrypted input to the service provider $P_S$.

Round 2 (steps 2-17): The service provider may compute encrypted, blinded sums of the input values and to return to the players P. Furthermore, $P_S$ may conduct a rank computation after which each player may be attributed a rank of some player $P_j$'s input value. Given that rank, a given player $P_i$ may receive an encrypted, blinded input or an encrypted random value via OT, depending on whether the given player's assigned rank is in the interval of the respective statistical measure.

Round 2 may be repeated for any composite statistical measures such as median, minimum, maximum, bottom quartile, and top quartile, for example. Those skilled in the art will appreciate calculations of rankings based on other divisions of a peer group additionally or alternatively to median and quartiles, e.g., tertiles, quintiles, percentiles, or other quantiles, in some embodiments. In similar context, index, a composite statistic, or composite measure, may refer to any of a mean, median, mode, variance, standard deviation, range, minimum, maximum, quintile, or other ranking from among a set of related values, for example.

Players may decrypt the blinded sum (of the n input values) that they receive, and the players may return the decrypted, blinded sum back to $P_S$ together with a MAC tag of the blinded sum. $P_S$ may send the sum to each player $P_i$. Players may compute the mean of the n input values by dividing the sum by n. After computing the mean, a player may re-randomize OT step outputs and send the re-randomized outputs back to the service provider. Each player may compute a squared difference between its own input and the mean, sending the encrypted result back to $P_S$ as a basis for variance computation.

Round 3 (steps 18-42): The service provider may compute an encrypted, blinded variance and encrypted, blinded interval aggregates (of the k values in the interval) for the composite statistical measures such as median, minimum, maximum, bottom quartile, and top quartile, for example, by multiplying the values received in Round 2. $P_S$ may send the resulting products to the players together with the hashed MAC tags of the blinded sum (of the n input values). The latter may then be used by the players to validate whether each player previously received the same blinded sum (of the n input values). Similar to Round 2, each player then may decrypt the blinded variance and the blinded interval aggregates to be sent to $P_S$ together with their respective MAC tags. In the last steps of Round 3, $P_S$ may send the unblinded variance and the unblinded interval aggregates to the players.

Round 4 (steps 43-48): The service provider may send the hashed MAC tags of the blinded variance and the blinded interval aggregates of the median, minimum, maximum, bottom quartile, and top quartile, for example, to each player. These composite statistics may be used by the players for validation of output integrity, in some embodiments.

Given the interval aggregates, the players may locally compute the statistical measures median, minimum, maximum, bottom quartile, and top quartile (and/or other rankings or composite statistics), such as by dividing the interval aggregates by k, according to some embodiments.

Figure 5:
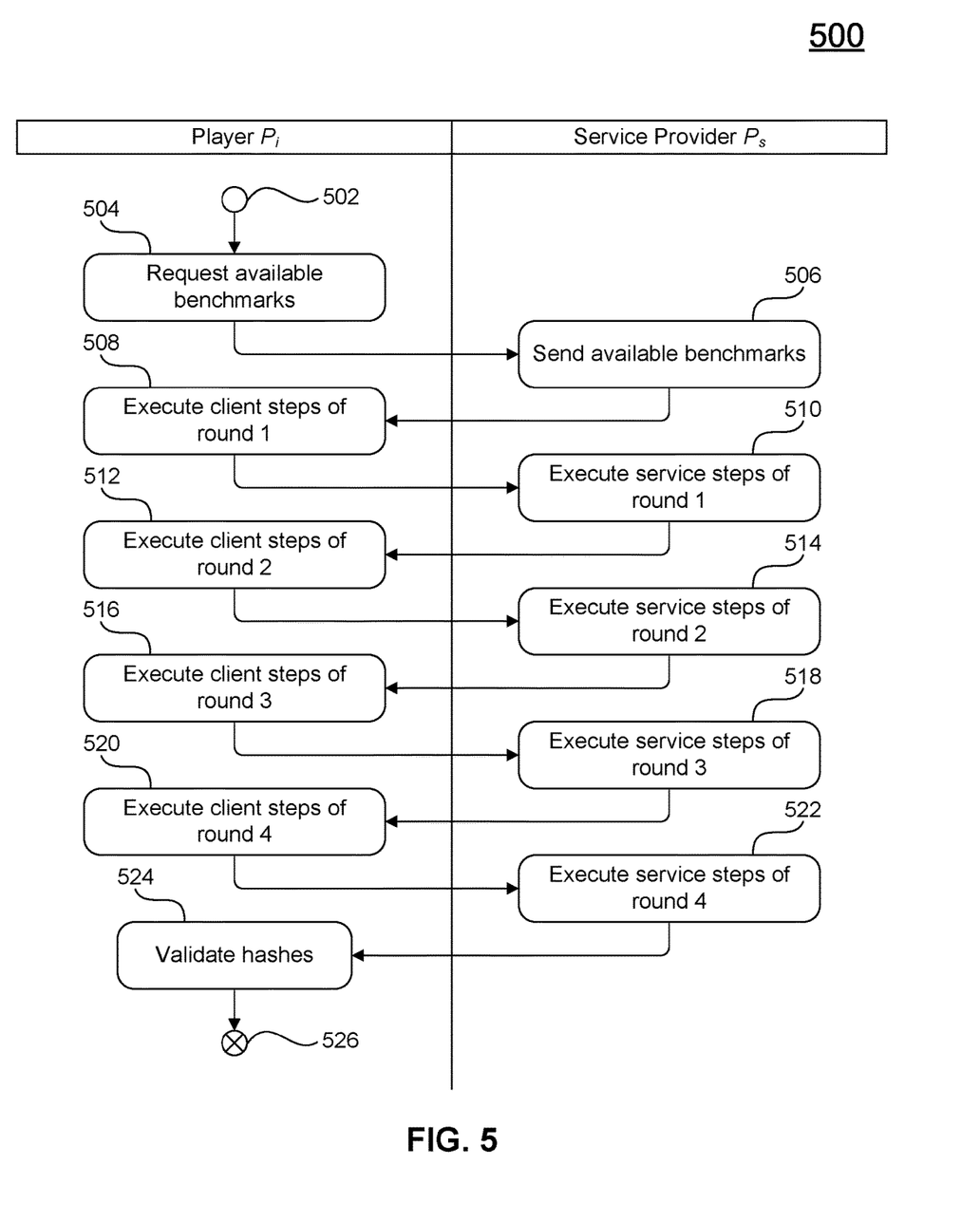
FIGS. 5-9 are flowcharts depicting iterations of protocol steps for encryption, comparison, and validation of values, according to some embodiments.
Figure 6:
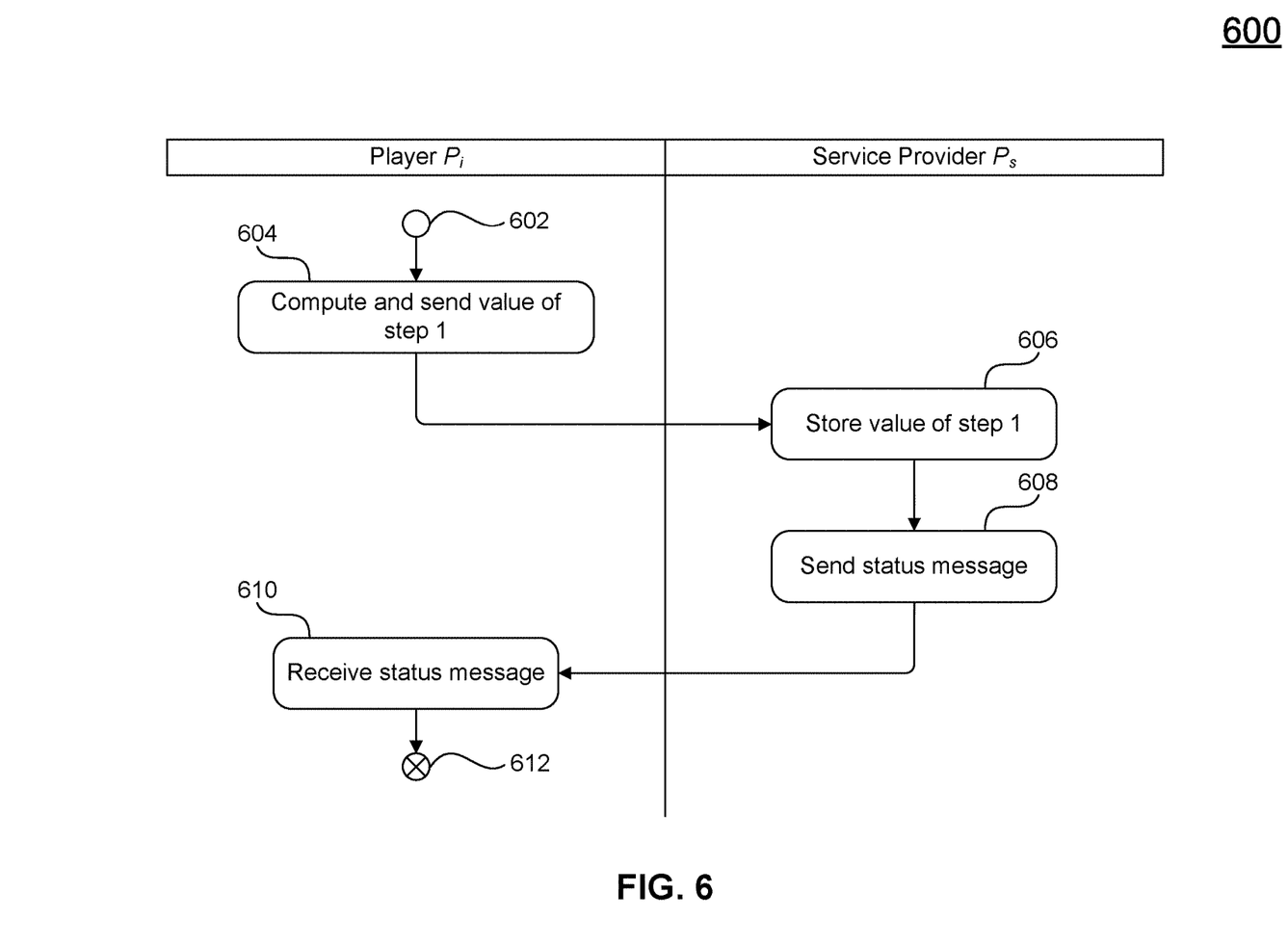

FIGS. 5-9 are flowcharts depicting iterations of protocol steps for encryption, comparison, and validation of values, according to some embodiments. FIG. 5 is a flowchart depicting an overview of execution of each of the above Rounds at a client (player) and service (provider), between request and validation steps. FIG. 6 is a flowchart showing further detail with respect to Round 1, including exchange of at least one status message.

Figure 7:
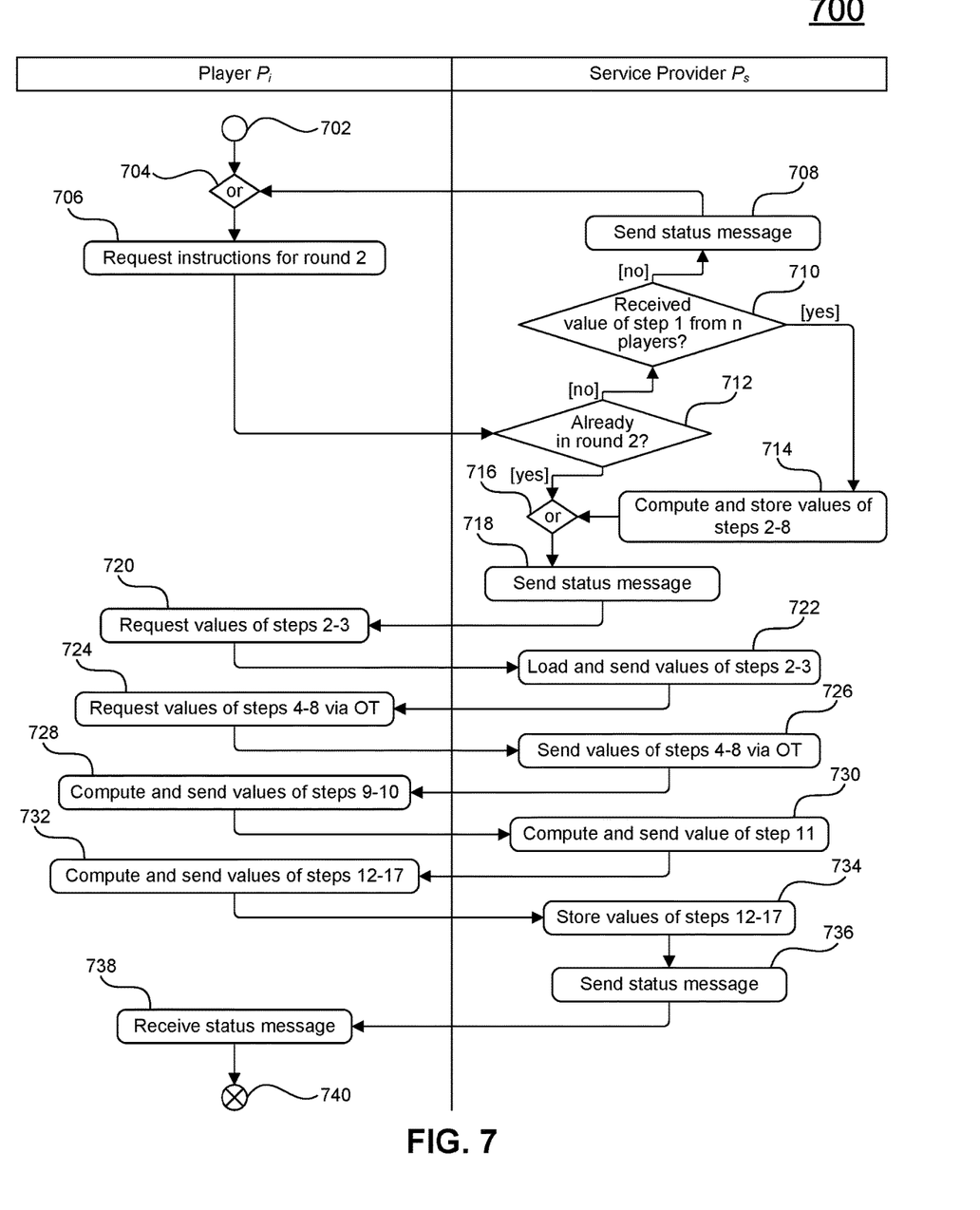
Figure 8:
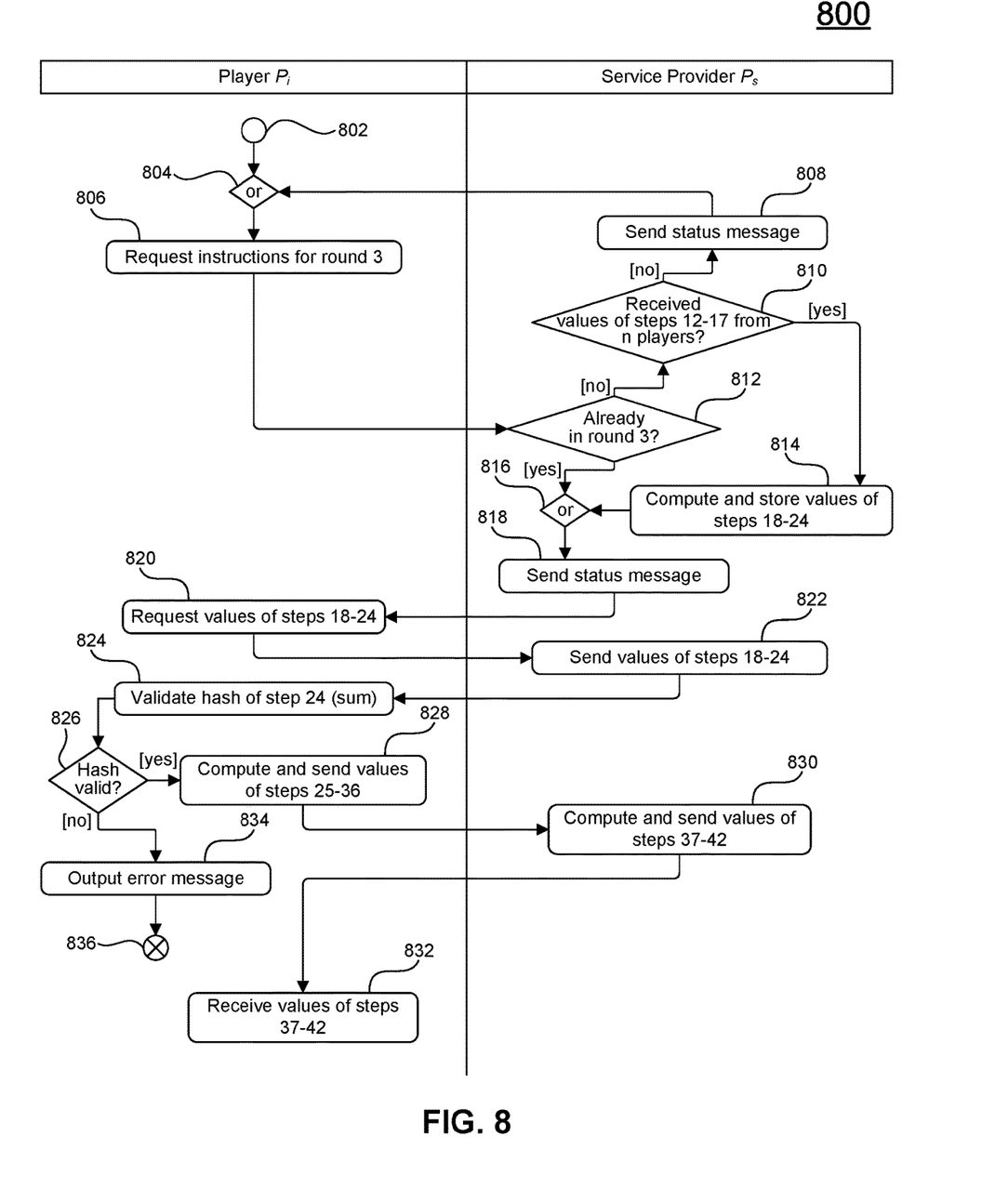
Figure 9:
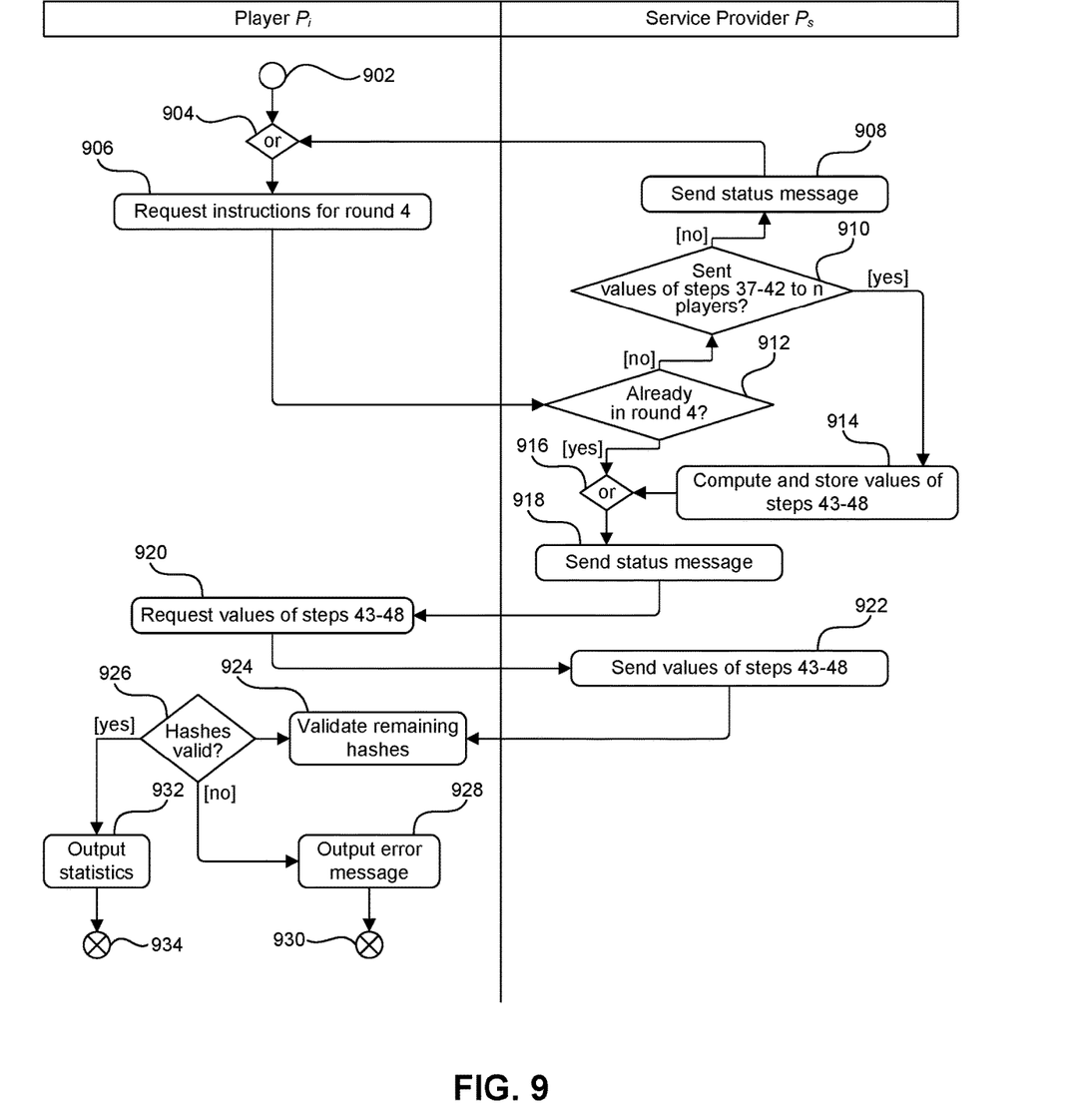

FIG. 7 is a flowchart showing further detail with respect to Round 2. FIG. 8 is a flowchart showing further detail with respect to Round 3. FIG. 9 is a flowchart showing further detail with respect to Round 4. FIG. 9 further shows detail relating to validation, and where an error message may be output if a given hash is not valid.

FIGS. 6-9 additionally account for one or more (n) participating players as members of a peer group. Thus, in an embodiment, protocol execution may involve n players submitting encrypted input (e.g., a given KPI) and a service provider (e.g., a cloud service). In a dialog-like fashion with 4 communication rounds, the n players and the service provider may jointly compute "interval statistical measures," e.g., mean of k median elements as described above. During this process, the encrypted inputs may be encrypted throughout, without any decryption process.

In this embodiment, the encrypted inputs, any intermediate result, and the interval statistics may be decrypted only by the players, not by the service provider, because only the players may have the secret decryption key. In the Round 3 of the protocol, the players may decrypt the interval statistics (cryptographically blinded by adding a random value) and send the statistics (still in blinded form) to the service provider.

Therefore, the result of the protocol execution is a set of interval statistical measures, e.g., mean of the k median elements. These interval statistics may then be compared to a player's secret KPI to investigate the player's performance compared to the other players that where involved in the protocol execution. This final comparison may not necessarily be considered an actual step of the protocol in all embodiments.

Thus, a secure multi-party benchmarking protocol based on homomorphic encryption may be realized for computing interval statistics that preserve privacy for confidential inputs. These interval statistics may summarize an interval around a specific rank, e.g., the median of the inputs, in some embodiments, or other quantile values, for example. Such an "interval statistic" may be further generalized as the mean of k median elements of the inputs. In such a manner, exact inputs, e.g., an actual median input value, may remain secret.

Figure 2:
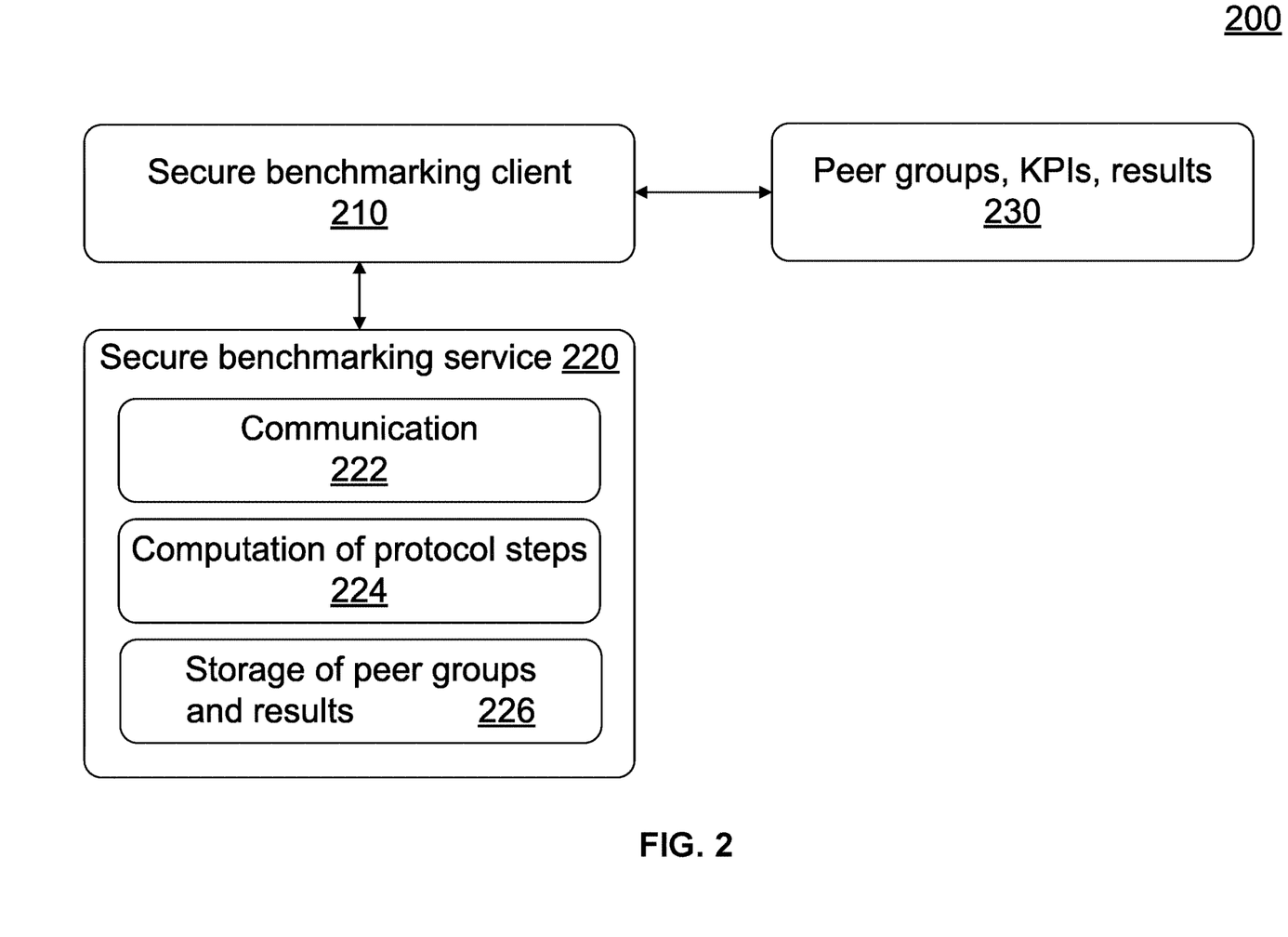
FIG. 2 is a block diagram of an example system architecture, according to some embodiments.

FIG. 2 is a block diagram of an example system architecture 200, according to some embodiments. An overview of one embodiment of this secure benchmarking system implementation may be seen as depicted in FIG. 2. A block diagram is shown in FIG. 2, depicting a non-limiting example, including computer system platforms and components, at a high level, that may implement and benefit from the enhanced techniques described herein. Other embodiments or implementations may be realized within the scope and spirit of this disclosure. An accompanying description of FIG. 2 follows in the paragraphs below.

In an embodiment, one example implementation may include at least two parts: a secure benchmarking client 210, and a secure benchmarking service 220. Either or both may use at least one database, which may include structured data store implemented using PostgreSQL, as one non-limiting example, to enable persistent data storage. For example, secure benchmarking client 210 may interface with a specific database of its own peer groups, KPIs, and results 230. The service may be implemented as a Java servlet, for example, running on Cloud Foundry, in one non-limiting embodiment.

The secure benchmarking client 210 may be implemented as a Java console application, for example. During an execution of the improved benchmarking protocol with interval statistics based on homomorphic encryption, the secure benchmarking client 210 and the secure benchmarking service 220 may communicate with each other, e.g., via HTTPS, sending strings of serialized data or objects. The secure benchmarking service 220 may include a communication 222 microservice or module, according to some embodiments.

The secure benchmarking service 220 may further include a computation 224 microservice or module, according to some embodiments, to perform computation of protocol steps, e.g., for (semi-)homomorphic encryption and statistical measures of values (e.g., confidential KPIs) encrypted therewith. Any components of the secure benchmarking service may access a data store of the secure benchmarking service itself, which may be a database storing data from multiple peer groups and results 226. Such results stored in 226 may be derived from the computation 224 microservice or module, in some embodiments.

Other programs, protocols, or architectures similarly configured to deliver the same results also fall within the spirit and scope of this disclosure. FIG. 2 shows one non-limiting example of a system architecture, but other configurations may be realized within the scope of the claims attached hereto.

Figure 3:
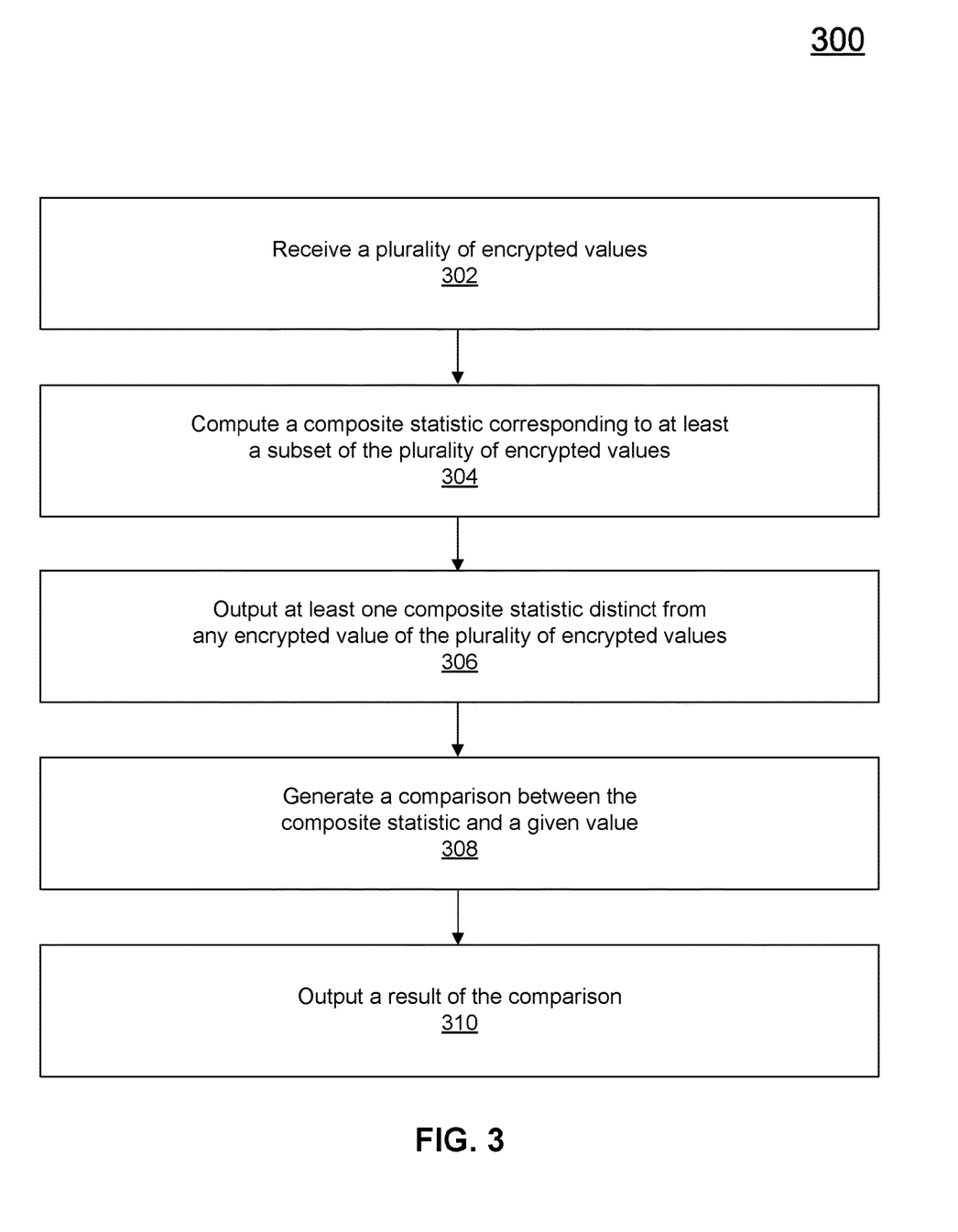
FIG. 3 is a flowchart illustrating a process implementing some of the enhanced techniques described herein, according to some embodiments.

Referring to FIG. 3, a flowchart here illustrates a process 300 implementing some of the enhanced techniques described herein, according to some embodiments. Process 300 may be performed by processing logic that may comprise hardware (e.g., circuitry, dedicated logic, programmable logic, microcode, etc.), software (e.g., instructions executing on a processing device), or a combination thereof.

Process 300 shall be described with reference to FIGS. 1-4. However, process 300 is not limited only to those example embodiments. The steps of process 300 may be performed by at least one computer processor coupled to at least one memory device. An exemplary processor and memory device(s) are described below with respect to FIG. 4. In some embodiments, process 300 may be performed by a system of system architecture 200 in FIG. 2, which may further include at least one processor and memory such as those of FIG. 4.

In 302, at least one processor 404 may be configured to receive a plurality of encrypted values. The encrypted values may be encrypted using at least one encryption key, for example, according to a homomorphic or semi-homomorphic encryption scheme. The equations and protocol steps described above (e.g., equations 1-23 and protocol steps 1-48) further describe examples pertaining to homomorphic and semi-homomorphic encryption, by which values may remain in an encrypted state while being transformed.

In some embodiments, as with round 1, step 1 of the example protocol above, encrypted values received by the at least one processor 404 may include values of a given KPI for each of a plurality of entities belonging to a given peer group. Additionally or alternatively, the encrypted values may represent multiple different KPIs and/or values from entities belonging to multiple groups, which may or may not overlap. Databases, such as for storage of peer groups and results 226 in FIG. 2, may store such values for a given benchmarking service 220.

In 304, processor 404 may be configured to compute a composite statistic corresponding to at least a subset of the plurality of encrypted values. The composite statistic may be calculated to be distinct from any encrypted value of the plurality of encrypted values, thereby preserving privacy.

For example, as shown in FIG. 1, if an entity has a KPI in the middle of its peer group, e.g., 50th of 99, a conventional median calculation of KPIs in the peer group would divulge the actual KPI of the 50th entity, possibly compromising the private identity of that 50th entity of the peer group.

To mitigate this risk of unintended disclosure, a composite statistic of the peer group may be further masked by a composite statistic of a specified or predetermined interval around a given data point, such that the value given data point by itself is not revealed. Thus, instead of divulging the value of the 50th peer group member, the mean of corresponding values for the 49th, 50th, and 51st members may be used to approximate the median of the peer group without divulging any actual value of a given member, as shown in FIG. 1.

The larger the interval, the more the risk of disclosure is mitigated. However, larger interval sample sizes with respect to overall peer group sizes may also render the corresponding composite statistics more susceptible to being skewed by outliers and therefore potentially less reliable or informative.

In 306, processor 404 may be configured to output the at least one composite statistic.

the composite statistic comprises at least one of mean, median, mode, minimum, maximum, range, variance, standard deviation, quantile, or ranking. The composite statistic may further represent an approximation of the desired composite statistic based on a separate composite statistic of an interval around the desired element, rank, or other composite statistic, for example.

Using any of the various (semi-)homomorphic encryption scheme(s) and/or protocol step(s) described herein, a service provider, such as using secure benchmarking service 220, may be able to calculate any of the above composite statistics, including further obscured composite statistics by separate interval composite statistics, all without having access to the actual underlying cleartext values corresponding to the encrypted values received at 302.

In 308, the at least one processor 404 may be configured to generate a comparison between the composite statistic and a given value. In some embodiments, the at least one processor 404 may include a processor of a client as a given player (peer-group member), and the given value may be the given player's input value, which may be stored locally in plaintext. In further embodiments, the at least one processor 404 may include one or more processors of a service provider and/or third-party provider, which may compare the composite statistic with a given encrypted value of the plurality of encrypted values. For example, with any of the above-mentioned scenarios of 308, in lieu of outputting an absolute ranking (e.g., 48th out of 217 members of a peer group, to name one illustrative example), processor 404 may instead generate a relative measure of a given member of a peer group based on the output at 306.

For example, the at least one processor 404 may be able to determine that a given member is above or below the median (or approximated median) of the peer group, for example, without indicating how far above or below, or where in exact rankings the given member may be in the peer group. Any other composite statistic or approximation may be used as a basis for comparison, e.g., by a client comparing its own inputs against composite statistics or similar output from a service provider, in some embodiments.

Figure 4:
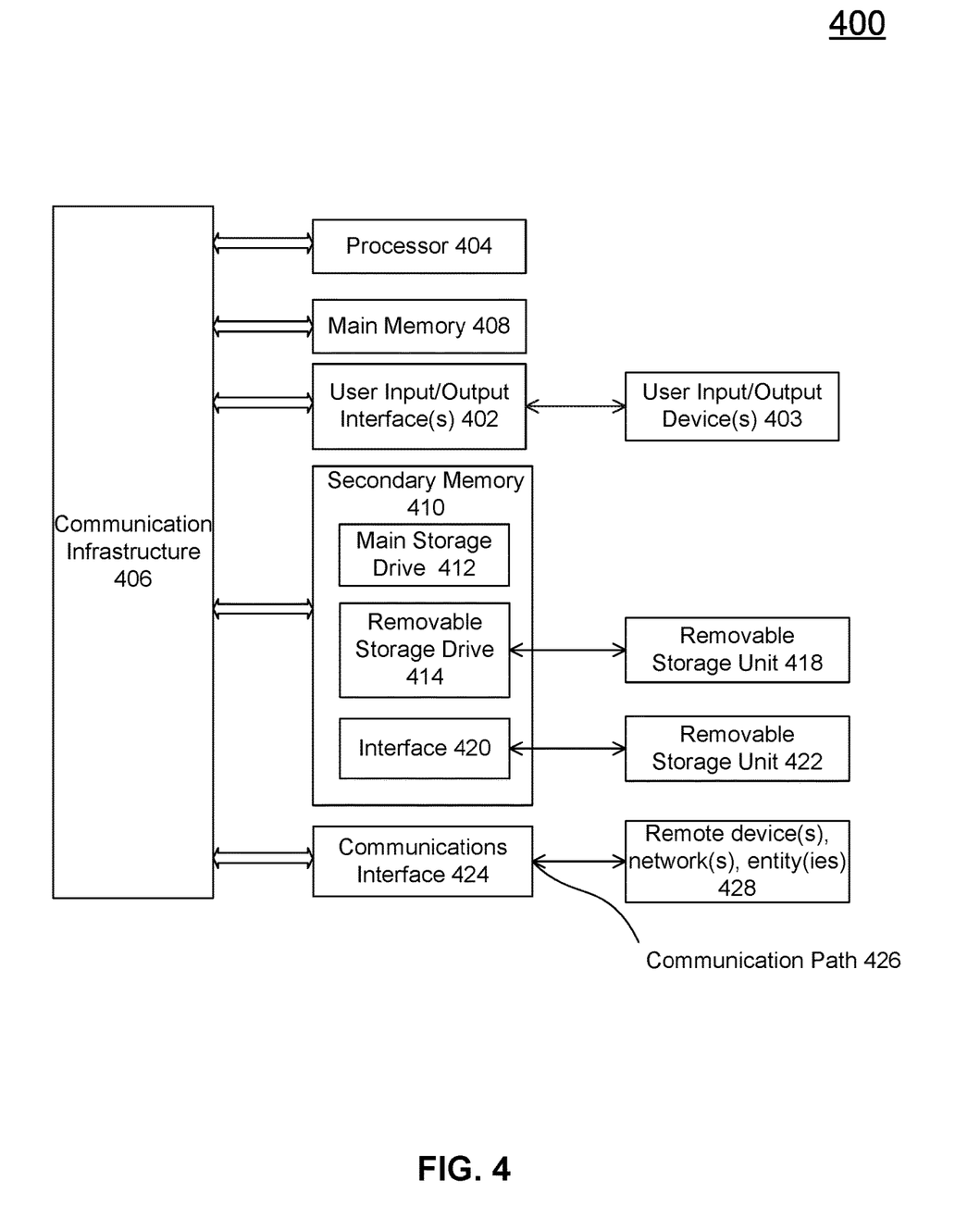
FIG. 4 is a block diagram of an example computer system useful for implementing various embodiments.

In 310, the at least one processor 404 may be configured to output a result of the comparison. The output may thus be from a service to a client, in a way that avoids divulging sensitive information of other members to the client or to the service. An example of a client implementation may be an instance of computer system 400 as shown in FIG. 4 and described further below. In some embodiments, a comparison result may be computed and handled in plaintext locally at a member's client implementation without divulging sensitive information of the member to other members or to the service. In so doing, privacy may be reliably protected without requiring a trusted platform, as the member's own comparison result would not leave the member's client implementation.

For example, in further embodiments, the plurality of encrypted values may be derived from confidential data received via at least one untrusted party, e.g., a service provider and/or other competing parties as members of the peer group. Such confidential data may be derived from a plurality of competing parties. Computation of composite statistics thus may further include secure multiparty computation, in some embodiments.

Not all steps of process 300 may be needed in all cases to perform the enhanced techniques disclosed herein. Further, some steps of process 300 may be performed simultaneously, or in a different order from that shown in FIG. 3, as will be understood by a person of ordinary skill in the art.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424.

Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by at least one processor, a plurality of encrypted values;
   computing, by the at least one processor, a statistical measure corresponding to at least a subset of the plurality of encrypted values,
     wherein the plurality of encrypted values remain in an encrypted state during the computing, and
     wherein the statistical measure is encrypted;
   determining, by the at least one processor, an interval of the plurality of encrypted values, wherein the interval comprises a value corresponding to the statistical measure;
   calculating, by the at least one processor, an anonymized composite statistic, instead of providing the statistical measure,
     wherein the interval is used as a basis for the anonymized composite statistic, providing a layer of anonymization for individual values of the plurality of encrypted values within the interval, and
     wherein the anonymized composite statistic is within the interval and distinct from the statistical measure or any encrypted value of the plurality of encrypted values; and
   outputting, by the at least one processor, the anonymized composite statistic instead of the statistical measure or any encrypted value of the plurality of encrypted values,
     wherein the receiving, computing, and outputting are performed by one or more computing devices.

2. The method of claim 1, the outputting further comprising:
   generating, by the at least one processor, a comparison between the statistical measure and a given encrypted value of the plurality of encrypted values; and
   outputting, by the at least one processor, a result of the comparison.

3. The method of claim 1, wherein the plurality of encrypted values are encrypted using at least one encryption key according to a homomorphic encryption scheme.

4. The method of claim 1, wherein the plurality of encrypted values are derived from confidential data, and wherein the receiving is performed via at least one untrusted party.

5. The method of claim 4, wherein the confidential data are derived from a plurality of competing parties, and wherein the computation comprises secure multiparty computation.

6. The method of claim 1, wherein the statistical measure or the anonymous composite statistic comprises at least one of mean, median, mode, minimum, maximum, range, variance, standard deviation, quantile, or ranking.

7. The method of claim 1, further comprising hashing, by the at least one processor, at least one message-authentication code (MAC) tag derived from a cryptographically blinded value of a result computed from a plaintext space of a cryptosystem.

8. A system, comprising:
   at least one memory device configured to store instructions; and
   at least one computer processor configured to execute the instructions stored in the at least one memory device, wherein the instructions, when executed by the at least one computer processor, cause the system to perform operations comprising:
     receiving a plurality of encrypted values;
     computing a statistical measure corresponding to at least a subset of the plurality of encrypted values,
       wherein the plurality of encrypted values remain in an encrypted state during the computing, and
       wherein the statistical measure is encrypted;

determining an interval of the plurality of encrypted values, wherein the interval comprises a value corresponding to the statistical measure;

calculating an anonymized composite statistic, instead of providing the statistical measure,
- wherein the interval is used as a basis for the anonymized composite statistic, providing a layer of anonymization for individual values of the plurality of encrypted values within the interval, and
- wherein the anonymized composite statistic is within the interval and distinct from the statistical measure or any encrypted value of the plurality of encrypted values; and outputting the anonymized composite statistic instead of the statistical measure or any encrypted value of the plurality of encrypted values.

9. The system of claim 8, wherein the outputting further comprises:
generating a comparison between the statistical measure and a given encrypted value of the plurality of encrypted values; and
outputting a result of the comparison.

10. The system of claim 8, wherein the plurality of encrypted values are encrypted using at least one encryption key according to a homomorphic encryption scheme.

11. The system of claim 8, wherein the plurality of encrypted values are derived from confidential data, and wherein the receiving is performed via at least one untrusted party.

12. The system of claim 11, wherein the confidential data are derived from a plurality of competing parties, and wherein the computation comprises secure multiparty computation.

13. The system of claim 8, wherein the statistical measure comprises at least one of mean, median, mode, minimum, maximum, range, variance, standard deviation, quantile, or ranking.

14. The system of claim 8, further comprising means for hashing at least one message-authentication code (MAC) tag derived from a cryptographically blinded value of a result computed from a plaintext space of a cryptosystem.

15. A non-transitory computer-readable storage medium having instructions stored thereon that, when executed by at least one computing device, cause the at least one computing device to perform operations comprising:

receiving a plurality of encrypted values;

computing a statistical measure corresponding to at least a subset of the plurality of encrypted values,
- wherein the plurality of encrypted values remain in an encrypted state during the computing, and
- wherein the statistical measure is encrypted;

determining an interval of the plurality of encrypted values, wherein the interval comprises a value corresponding to the statistical measure;

calculating an anonymized composite statistic, instead of providing the statistical measure,
- wherein the interval is used as a basis for the anonymized composite statistic, providing a layer of anonymization for individual values of the plurality of encrypted values within the interval, and
- wherein the anonymized composite statistic is within the interval and distinct from the statistical measure or any encrypted value of the plurality of encrypted values; and outputting the anonymized composite statistic instead of the statistical measure or any encrypted value of the plurality of encrypted values.

16. The non-transitory computer-readable storage medium of claim 15, the outputting further comprising:
generating a comparison between the statistical measure and a given encrypted value of the plurality of encrypted values; and
outputting a result of the comparison.

17. The non-transitory computer-readable storage medium of claim 15, wherein the plurality of encrypted values are encrypted using at least one encryption key according to a homomorphic encryption scheme.

18. The non-transitory computer-readable storage medium of claim 15, wherein the plurality of encrypted values are derived from confidential data, wherein the receiving is performed via at least one untrusted party, and wherein the computation comprises secure multiparty computation.

19. The non-transitory computer-readable storage medium of claim 15, wherein the statistical measure comprises at least one of mean, median, mode, minimum, maximum, range, variance, standard deviation, quantile, or ranking.

20. The non-transitory computer-readable storage medium of claim 15, the operations further comprising hashing at least one message-authentication code (MAC) tag derived from a cryptographically blinded value of a result computed from a plaintext space of a cryptosystem.

* * * * *